(12) United States Patent
Wiacek et al.

(10) Patent No.: US 11,042,607 B2
(45) Date of Patent: Jun. 22, 2021

(54) RECOGNITION-BASED CONTENT MANAGEMENT, SYSTEMS AND METHODS

(71) Applicant: NANT HOLDINGS IP, LLC, Culver City, CA (US)

(72) Inventors: John Wiacek, Culver City, CA (US); Patrick Soon-Shiong, Los Angeles, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 875 days.

(21) Appl. No.: 14/466,903

(22) Filed: Aug. 22, 2014

(65) Prior Publication Data

US 2015/0058229 A1  Feb. 26, 2015

Related U.S. Application Data (60) Provisional application No. 61/869,565, filed on Aug. 23, 2013.

(51) Int. Cl.
*G06F 21/10* (2013.01)
*H04L 29/08* (2006.01)
(Continued)

(52) U.S. Cl.
CPC .......... *G06F 21/10* (2013.01); *G06K 9/4671* (2013.01); *G06Q 50/184* (2013.01); *H04L 67/02* (2013.01); *H04L 67/16* (2013.01)

(58) Field of Classification Search
None
See application file for complete search history.

(56) References Cited

U.S. PATENT DOCUMENTS 5,691,527 A * 11/1997 Hara .................... G06K 7/1093
235/456
6,711,293 B1   3/2004 Lowe
(Continued)

FOREIGN PATENT DOCUMENTS

WO   2007/104026   9/2007
WO   2007/130688   11/2007

OTHER PUBLICATIONS

Korean Intellectual Property Office, "Notification of Transmittal of the International Search Report and the Written Opinion of the International Searching Authority, or the Declaration", International Application No. PCT/US2014/052416, dated Dec. 8, 2014.

(Continued)

*Primary Examiner* — Steven S Kim
*Assistant Examiner* — Jason B Fenstermacher
(74) *Attorney, Agent, or Firm* — Stetina Brunda Garred and Brucker (57) ABSTRACT

A content activation system is presented. A recognition engine is configured to obtain a descriptor set associated with an identified object represented within a digital representation. A content management module can be coupled with the recognition engine. The content management module can be configured to: obtain the descriptor set from the recognition engine, identify at least one content activation policy as a function of the descriptor set, identify a content set associated with an identified object and based on the descriptor set, and configure an output device to activate (e.g., release, render, present, interact, etc.) the content set according to the activation policy.

38 Claims, 3 Drawing Sheets

(51) Int. Cl.
*G06Q 50/18* (2012.01)
*G06K 9/46* (2006.01)

(56) References Cited

U.S. PATENT DOCUMENTS

| | | | |
|---|---|---|---|
| 6,820,121 B1* | 11/2004 | Callis | H04L 45/745 |
| | | | 709/225 |
| 7,016,532 B2 | 3/2006 | Boncyk et al. | |
| 8,218,873 B2 | 7/2012 | Boncyk et al. | |
| 8,224,077 B2 | 7/2012 | Boncyk et al. | |
| 8,224,078 B2 | 7/2012 | Boncyk et al. | |
| 8,416,981 B2 | 4/2013 | Vanhoucke et al. | |
| 9,053,482 B2* | 6/2015 | Hill | G06Q 30/00 |
| 9,171,298 B2* | 10/2015 | Atkinson | G06Q 20/1235 |
| 2002/0124024 A1 | 9/2002 | Patterson et al. | |
| 2003/0069853 A1* | 4/2003 | Bryant | G06F 21/10 |
| | | | 705/59 |
| 2006/0241792 A1 | 10/2006 | Pretlove et al. | |
| 2007/0159522 A1 | 7/2007 | Neven | |
| 2010/0260426 A1* | 10/2010 | Huang | G06K 9/20 |
| | | | 382/218 |
| 2010/0293244 A1* | 11/2010 | Zhu | G06F 21/10 |
| | | | 709/217 |
| 2012/0122528 A1 | 5/2012 | Lyons et al. | |
| 2012/0154438 A1 | 6/2012 | Cohen | |
| 2012/0185393 A1* | 7/2012 | Atsmon | G06Q 20/10 |
| | | | 705/44 |
| 2012/0230543 A1 | 9/2012 | Boncyk et al. | |
| 2012/0233076 A1 | 9/2012 | Sutcliffe et al. | |
| 2012/0263154 A1 | 10/2012 | Blanchflower et al. | |
| 2012/0284122 A1* | 11/2012 | Brandis | G06K 9/6217 |
| | | | 705/14.64 |
| 2012/0299961 A1 | 11/2012 | Ramkumar et al. | |
| 2012/0311723 A1* | 12/2012 | Britt, Jr. | G06F 17/30023 |
| | | | 726/28 |
| 2013/0050258 A1 | 2/2013 | Liu et al. | |
| 2013/0260727 A1* | 10/2013 | Knudson | G06Q 30/00 |
| | | | 455/414.1 |
| 2013/0265333 A1* | 10/2013 | Ainsworth | G06F 3/017 |
| | | | 345/633 |
| 2013/0344958 A1 | 12/2013 | Mullen | |
| 2014/0002444 A1 | 1/2014 | Bennett et al. | |
| 2014/0223319 A1* | 8/2014 | Uchida | G06F 17/30277 |
| | | | 715/739 |
| 2014/0225924 A1* | 8/2014 | Loxam | G06T 19/006 |
| | | | 345/633 |
| 2015/0172853 A1 | 6/2015 | Liu et al. | |

OTHER PUBLICATIONS

Authorized Officer Hewitt, Calvin, L., II "International Preliminary Report on Patentability" dated Sep. 11, 2015. PCT/US14/52416 with appendix. 18 Pages.
Final Office Action in U.S. Appl. No. 16/660,661 dated Nov. 3, 2020.
Non-Final Office Action in U.S. Appl. No. 16/660,661 dated Jul. 31, 2020.
Non-Final Office Action in U.S. Appl. No. 16/660,661 dated Feb. 5, 2021.
Final Office Action in U.S. Appl. No. 16/660,661 dated May 4, 2021.

* cited by examiner

RECOGNITION-BASED CONTENT MANAGEMENT, SYSTEMS AND METHODS

This application claims priority to U.S. Application 61/869,565, filed Aug. 23, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is content management system technologies.

BACKGROUND

The following description includes information that may be useful in understanding the present invention. It is not an admission that any of the information provided herein is prior art or relevant to the presently claimed invention, or that any publication specifically or implicitly referenced is prior art.

Various types of virtual or digital content can be presented to consumers in response to the consumer engaging with real world objects. For examples, consumers can use apps on their smart phones to recognize objects within captured image data where the app then displays associated content to the consumer. However, when providing access to content, the software app, or rather the app provider should protect the rights of the content owner. In some cases a consumer could purchase or license content possibly by entering security codes to accept terms of service. Such requirements are burdensome to the consumer. A better approach would provide a user the ability to engage with a license without requiring additional user interactions. Rather, other types of information might be leveraged to enforce access rights beyond user interactions.

Some effort has been directed to presenting content to user based on user data. International patent application publication number WO 2007/104026 to Krikorian et al. (filed Mar. 8, 2006), discusses an approach to determine context information from media content, use the context information to pair supplemental content with the media content, and provide the viewer with the supplemental content. Generally, the system gleans context information by gathering data about media that the viewer is consuming, information about the user from registration data, the user's browsing history, etc. Using this information, the system selects supplemental content, e.g., advertising relevant to the user, and presents the content to the user. While this system addresses the need for supplying relevant content to a user, it does not address how to determine if such content should be activated or accessed in an appropriate manner based on recognizing objects.

With respect to augmented reality, U.S. patent application publication number 2012/0122528 to Lyons et al. (filed Dec. 15, 2010) teaches a method for enabling a user in an augmented reality gaming venue to use an augmented reality gaming venue component and a mobile device to find a particular game or gaming machine. The method includes: controlling a camera on the mobile device using the augmented reality gaming venue component, determining the orientation of the mobile device, querying a casino management system to retrieve data for the augmented reality gaming venue, generating a list of gaming machines and other objects currently visible to the camera, and rendering a camera captured image on a display of the mobile device, and overlaying icons on the image for each visible object to display additional visual information to a user. While this incorporates some aspects of object recognition and providing content, Lyons also fails to provide insight into activating content in a manner that respect rights of the content owner.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for facilitated access to content related to recognized objects through an activation policy.

SUMMARY OF THE INVENTION

The inventive subject matter provides apparatus, systems and methods in which content can be activated according to an activation policy as determined from a descriptor set generated from an image recognition algorithm executing on image data of an object. Contemplated content activation systems comprise a recognition engine and a content management module. The recognition engine is configured to obtain a descriptor set associated with an identified object as represented within a digital representation. The recognition engine is coupled to a content management module, which is configured to obtain the descriptor set from the recognition engine. The content management module is also configured to identify at least one content activation policy as a function of the descriptor set, and a content set associated with an identified object and based on the descriptor set. Further, the content activation module configures an output device to activate or otherwise render the content set according to the activation policy.

The identified object can be a real-world object such as a product, a toy, a vehicle, a machine, a living creature, an inanimate object, printed matter, a video, a video clip, a sound, a music, a light, a RFID, a magnet, a picture, a building, a human, an appliance, or an electronic device. Alternatively, the identified object can be a virtual object such as a rendered graphic, a game object, a digital image, a digital video, an animation, an augmented reality object, a sound, or a 3D modeled object.

The descriptor set can include descriptors of the same mode or of different modes. For example, some of the descriptors in the set can be image descriptors while others in the set can be motion descriptors.

The activation policy can include content activation criteria that define conditions under which the content set will be activated. In some embodiments, the activation policy can include content rendering rules that operate based on tracked features and recognized features in the digital representation derived from the descriptor set. In other embodiments, the activation policy can include content rendering rules that unlock at least some of the content set as a function of the descriptor set. In yet some embodiments, the activation policy can include content rendering rules that operate based on an in-app purchase of content. In these embodiments, the content can include purchased content.

In some embodiments, the activation policy can include a license to a set of content. In some of these embodiments, the activation policy can also include content rendering rules that operate based on a license fee associated with the license. In some other embodiments, the activation criteria can include a selection of content.

In some embodiments, the content activation system also includes a rights management module that is configured to enforce digital rights with respect to the content set according to of a content rights rules set that operates as a function of the descriptor set. The content rights rules set can include rules for at least one of the following as a function of the descriptor set: activation of the content set, deactivation of the content set, modification of the content sent, creation of the content set, localization of the content set, transactions related to the content set, or account interactions.

The content set can include different types of content. Example content includes image data, light data, RFID data, magnetic data, video data, game data, augmented reality data, audio data, kinesthetic data, tactile data, vibration data, texture data, application data, device command data, account data, shopping data, travel data, education data, sports data, news data, weather data, or medical data.

Examples of the output device include a printer, a 3D printer, a tablet, a smart phone, a kiosk, an appliance, a television, a vehicle, a computer, a phone, a wearable headset, a wearable AR headset, a wearable camera, a wearable device, or a camera.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network. One should appreciate that the disclosed content activation system provides many advantageous technical effects including facilitating user access to licensed content. The content activation system can identify an object within a digital representation. The content activation system can then identify a content activation policy and content associated with the identified object. For example, the system can provide a means for the user to purchase a licensing agreement to access content related to an object in a picture taken by the user. Further, the content activation system can then configure a device to activate or render the content for output.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein.

Similarly, all lists of values should be considered inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, when a system, engine, or a module is described as configured to perform a set of functions, the meaning of "configured to" is defined as one or more processors being programmed by a set of software instructions to perform the set of functions.

The inventive subject matter provides apparatus, systems and methods of activating digital content according to an activation policy that is determined from a digital image. In one aspect of the invention, a content activation system is presented. The content activation system is coupled with a content database storing a set of content that can be made available to different users. To activate some of the content, a user can capture a digital representation of one or more objects (e.g., an image captured using a camera of a smart phone) and sends the digital representation to the content activation system. Upon receiving the digital representation, the content activation system derives a descriptor set by executing an implementation of an image recognition algorithm on the digital representation.

The term "descriptor" is used euphemistically to mean a data structure stored in memory where the values in the data structure are derived by executing one or more algorithms on a digital representation of an object or scene. Descriptors might represent local or global features in the digital representation (e.g., edges, corners, etc.). Descriptors could also represent specific measures associated with patches of the image (e.g., SIFT descriptors, Histogram of Graidents, etc.). One can use an image recognition algorithm such as scale-invariant feature transform (SIFT; see U.S. Pat. No. 6,711,293 titled "Method and apparatus for identifying scale invariant features in an image and use of same for locating an object in an image" filed Mar. 6, 2000) to detect and describe local features (as descriptors) in images. Multiple descriptors can be derived from a single object. For example, a soda bottle can have a descriptor that describes a part of the logo on the bottle, an edge of the bottle, a cap shape of the bottle, etc. As such, each object is associated with a unique set of descriptors that uniquely define the different features of the object. In some embodiments, the content activation system can recognize objects that are represented in a digital representation based on the descriptors derived from the digital representation and the known associations between the descriptors and the objects.

In some embodiments, the content activation system can use the descriptor set derived from the digital representation to identify one or more activation policies for the user. In essence, the content activation system identifies the one or more activation policies based on recognized object(s) in the digital representation. The content activation system then applies the activation policies to the user.

Each activation policy sets forth a set of rules regarding the activation and rendering of content, as well as usage, interaction, and access control of the content by the user. In addition, different activation policies include rules for activating/managing different content. The content activation system then activates or otherwise renders the content according to the identified one or more activation policies, and also controls the usage/manipulation of the content by the user according to the one or more activation policies.

Figure 1:
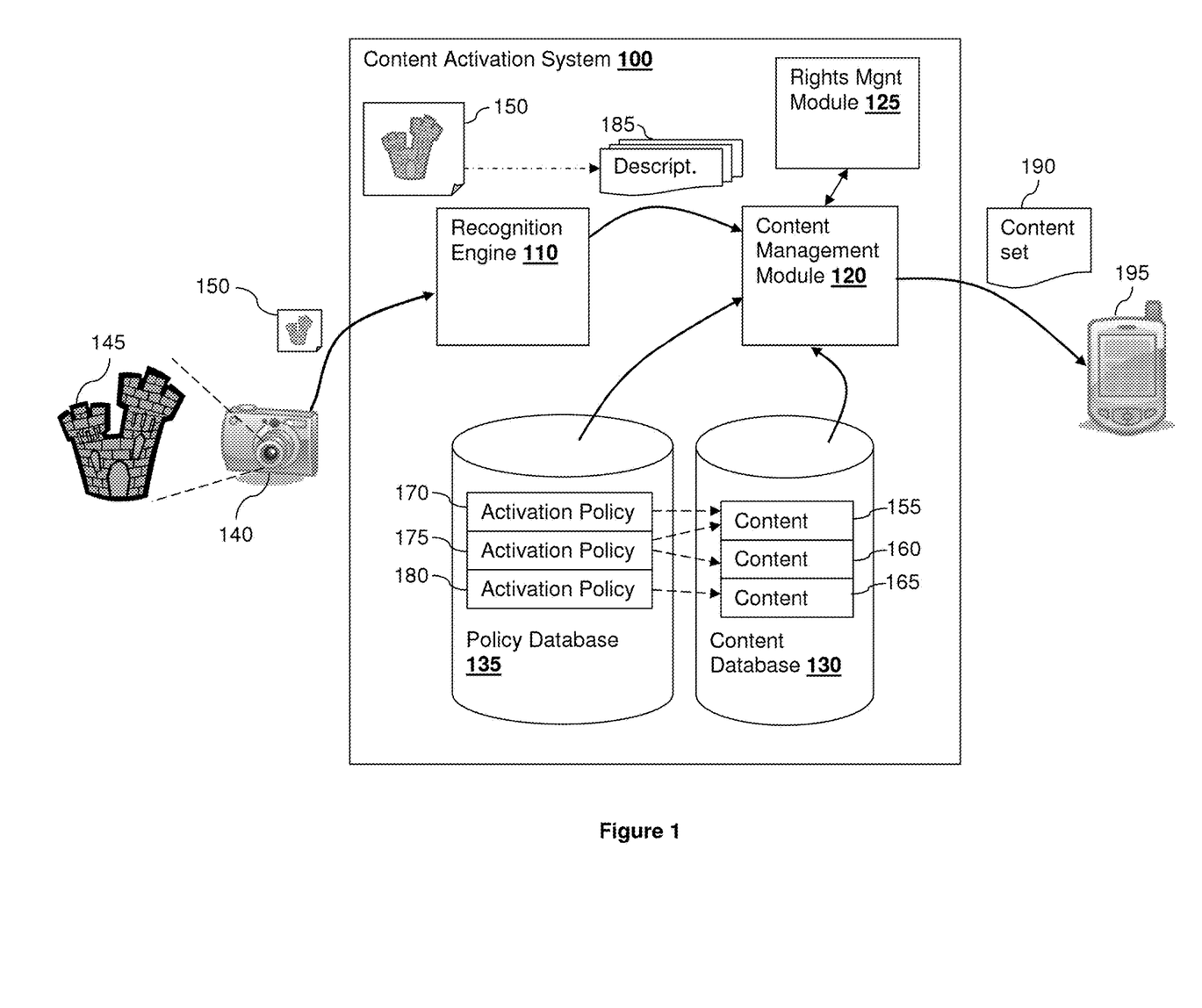
FIG. 1 is a schematic of a content activation system.

FIG. 1 illustrates one possible embodiment of such a content activation system 100. Content activation system 100 comprises a recognition engine 110 and a content management module 120. The content activation system 100 also comprises a content database 130 and a policy database 135, both of which are communicatively coupled with the content management module 120. Each of the content database 130 and policy database 135 comprises non-transitory permanent data storage such as a hard drive, a flash memory, etc., and can be implemented over one or more physical machines (e.g., across multiple hard drives, across multiple machines that are connected together via a network, etc.).

The content database 130 is configured to store a variety of content, such as content 155, content 160, and content 165. Content 155, 160, and 165 can include different types of content (e.g., images, videos, animations, control interfaces, content management interfaces, URLs, augmented reality data, etc.). The content was generated by content provider and to be made available by the content activation system 100 to users according to different activation policies.

The policy database 135 is configured to store activation policies, such as activation policy 170, activation policy 175, and activation policy 180. As mentioned above, an activation policy includes criteria data that indicates under which conditions one or more piece of a content set that is stored in the content database 130 should be activated or otherwise made available to a consumer. As such, different activation policies form the policy database 135 corresponds to a different content set from the content database 130. For example, activation policy 170 includes criteria data that governs the activation of a content set that includes content 155, activation policy 175 includes criteria data that governs the activation of a content set that includes content 155 and content 160, and activation policy 180 includes criteria data that governs the activation of a content set that includes content 165.

Contemplated policies include activation criteria that define requirements or optional conditions that should be satisfied before content is released. The activation criteria can include descriptor requirements (e.g., what descriptors are included in the received descriptor set, etc.), payment requirements (e.g., recognizing a credit card in the digital image and receiving approval to charge to the credit card by the user, etc.), location requirements (e.g., using GPS within a mobile device to detect a geographical location of the user, etc.), time requirements, user security clearance requirement, or others.

One should appreciate that the activation criteria can be applied to a content set as whole, individual portions of content, a hierarchy of content, or other aspects of the content set. Further, the activation policy can include rules governing deployment of the content where the rules could govern one or more of the following: layering content, restricting access to portions of the content, authorizing access to content, licensing content, notifying rights holders, presenting content based on time or location, logging events related to content access, purchasing content, distributing funds among stakeholder accounts, generating alerts, inventorying available content, or other actions.

As shown in FIG. 1, the content activation system 100 is communicatively coupled with an image capturing device 140 (e.g., a camera, a smart phone with a camera, etc.) over a network (e.g., wifi, Internet, WAN, LAN, PAN, VPN, etc.). A user can use the image capturing device 140 to capture an image 150 of an object, such as object 145 (presented here as a toy castle 145). The image 150, being a digital image or having been converted into a digital image, is considered to be a digital representation 150 of the object 145. The image capturing device 140 then sends the digital representation 150 to the content activation system 100 via the network.

Upon receiving the digital representation 150, the content activation system 100 uses a recognition engine 110 to derive a set of descriptors 185 based on local features that are recognized within the digital representation 150. The recognition engine 110 of some embodiments executes an implementation of an object recognition algorithm on digital representation 150 to derive the set of descriptors from the digital representation 150. In some embodiments, the object recognition algorithm can be SIFT FREAK, DAISY, FAST, or other image processing algorithms that yield descriptor sets from an image. The recognition engine 110 then sends the derived set of descriptors 185 to the content management module 120.

Depending on the format of the digital representation, the descriptor set 185 can have various attributes describing the nature of the set 185. The attributes can comprise one or more of properties reflecting the modality of the digital representation: image, video, audio, motion, magnetic, radiation, or other properties. The descriptor set attributes provide additional context when identifying corresponding activation policies. The descriptor set 185 can also serve numerous purposes. For example, the descriptor set 185 can be used in an object recognition step to identify the object in the image captured by the user. In contemplated embodiments of the inventive subject matter, it is possible to further employ the descriptor set 185 as (or point to) one or more information addresses, which can be used to locate at least one content activation policy and as a key to unlock the content associated with a content activation policy.

In an envisioned content activation system 100 of some embodiments, the descriptor set 185 obtained by the recognition engine can take in various forms. For example, the descriptor set 185 can include image descriptors or multi-modal descriptors. Exemplary image descriptors can contain information about the relationship between pixels. Image descriptors can relate to a number of image features. For example, shape descriptors can be region-based, contour-based, edges, corners, or based on 3D volumes among other types of image features. Color descriptors can also be obtained that correspond to the identified object. Examples of color descriptors include: dominant color descriptors, scalable color descriptors, color structure descriptors, color layout descriptors, groups of frame, or groups of pictures. Region locator descriptors and spatio-temporal locator descriptors are also possible descriptor sets that the recognition engine can obtain. Texture descriptors can include: textons, homogeneous texture descriptors, texture browsing descriptors, and edge histogram descriptors. Yet other descriptors sets that can be obtained include motion descriptors. Such motion descriptors can be important when the identified object is moving in real life or on video, being sensed by a tracking device, or when the camera or tracking device is in motion. Exemplary motion descriptors can be: motion activity descriptors, motion trajectory descriptors, warping and parametric motion descriptors, directed acyclic graphs, etc. In some of these embodiments, the recognition engine 110 would require the user to supply more than one image (e.g., more than one frame) of the object to derive the motion related descriptors. Object and face recognition are examples of specific domain information descriptors that are relevant to objects identified in a scene or in the context of the digital representation.

In one example, the recognition engine 110 derives a descriptor set 185 that includes multi-modal descriptors. In this example, the descriptor set 185 can comprise data from combinations of inputs such as: color, contour, shape, audio, video, light, RFID, magnetic, biometric, time, location, context, and other attributes from the digital representation 150. It can be desirable for the multi-modal descriptors to be heterogeneous combinations of image descriptors and non-image descriptors for more accuracy in describing the object 145.

Based on the descriptor set 185, the content management module 120 traverses the activation policies stored in the policy database to identify one or more activation policies that are relevant to the descriptors in the descriptor set 185. The content management module 120 then activates a content set 190 (retrieved from the content database 130) in an output device 195 (e.g., a mobile phone) according to the one or more activation policies. To enhance the speed of traversing the activation policies in the policy database 135, activation policies can be indexed according to different descriptors associated with different objects. In some embodiments, the descriptor set can link to an information address (e.g., network address, URL, URI, IP address, etc.) that directs the content management module to the location of a content activation policy.

Activating the content set 190 can involve one or more actions depending on the nature of the content set 190. When the content set includes presentable content such as images, animation, video, sound, etc., activating the content set comprises rendering the content set in an output device 195. The output device 195 can be the same device that captures the image 185, or can be a different device. Examples of output device 195 include a printer, a 3D printer, a tablet, a smart phone, a gaming device or console, a kiosk, an appliance, a television, a vehicle, a computer, a phone, a wearable headset, a wearable AR headset, a wearable camera, a wearable device, or a camera.

The content set 190 can include one or more content elements from the content database 130. The content can comprise different modalities of content (e.g., animation, audio, video, image, text, etc.). In addition, the content management module 120 can activate the content set 190 by rendering the content set 190 or otherwise make the content set 190 available for a user of a device 195 (e.g., a smart phone 195). In some embodiments, the device 195 comprises the image capturing device 140 that captured the digital representation 150. The content, links to the content, activation policies, or other information can be indexed into the policy and content databases 130 and 135 based on the identified descriptors (e.g., using data structure such as spill trees, kd trees, kNN schemes, etc.). In exemplary embodiments, the content management module 120 uses the descriptor set 185 and/or its attributes to confirm that the content activation criteria specified by the activation policy are met. Upon confirmation that the activation criteria are met, the content management module 120 can initiate presentation of the content to the user. It is envisioned that all of these steps can take place in real-time with minimal lag between object recognition and initiating user access to the protected content.

One should appreciate that nature of the inventive subject matter. In a very real sense, every recognizable object can become a code that is instrumental in unlocking licensed content associated with the object. Still further, every recognizable object can be considered an app store through which consumers, upon recognition of the object, can purchase related content in accordance with the activation policy.

In addition to activating the content set 190, the content activation system 100 can also perform other functions in managing the content set after it is activated. In some embodiments, the content activation system 100 also includes a rights management module 125 that is configured to enforce digital rights with respect to the content set according to a content rights rules set. The content rights rules set can operate as a function of the descriptor set 185 and/or other conditions (e.g., location condition, time condition, user security level condition, etc.). For example, the user can continue to capture new images of the objects (e.g., the user can capture a video that produces images/frames over time), and based on the newly captured images and the descriptor sets derived by the recognition engine 110 from the newly captured images, the rights management module 125 can perform one or more of the following functions: deactivating the content set (to make it unavailable to the user), modifying the content set, creating new content to be activated for the user, localizing the content set, and perform other transactions (e.g., purchasing, sharing, distributing, etc.) related to the content set.

Figure 2:
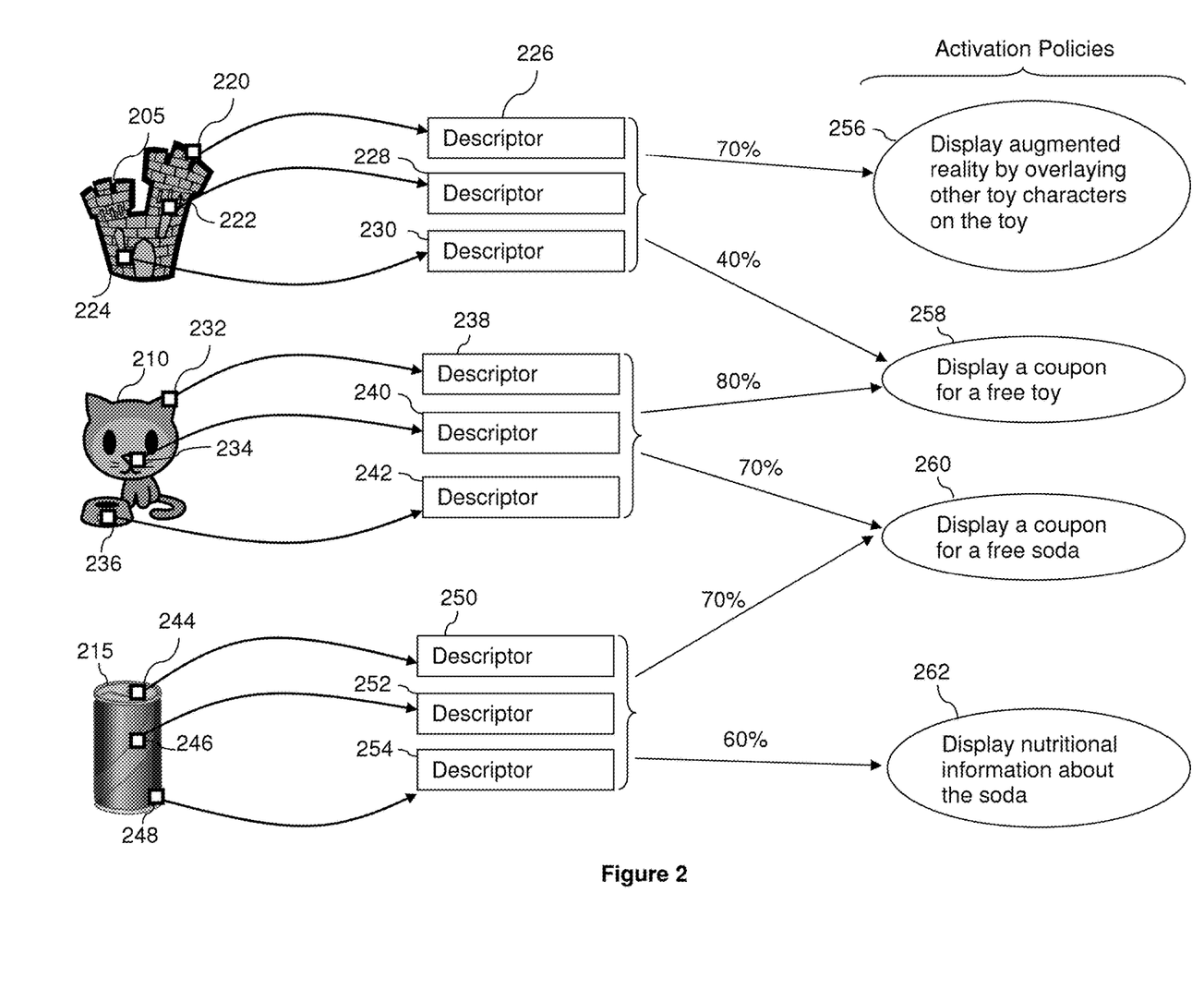
FIG. 2 illustrates the relationship among objects, descriptors, and activation policies.

FIG. 2 illustrates how the content activation system 100 identifies one or more activation policies based on a digital representation in greater detail. Three example objects, namely, a toy castle 205, a toy cat 210, and a soda can 215, are used to illustrate this activation policies identification process that can be performed by the content activation system 100 of some embodiments. Although the three objects shown here are real life objects, it is contemplated that the object can also be a virtual object such as a rendered graphic, a game object, a digital image, a digital video, an animation, an augmented reality object, a sound, a displayed image on a display (e.g., cell phone display, television, electronic billboard, etc.) or a 3D modeled object.

First, multiple images captured from different perspective of each object is generated. Preferably, the multiple images are captured in a way such that all (or at least a large portion, preferably more than 70%, even more preferably more than 80%, and even more preferably more than 90% of) surface areas of the object are covered. The images are then sent to an object recognition engine for deriving descriptors. The object recognition engine can be the recognition engine 110 of the content activation system 100, or a different object recognition engine separate from the content activation system 100.

In some embodiments, the object recognition engine derives multiple descriptors for each of the objects 205, 210, and 215. The objection recognition engine identifies several points on the portions of the image that represent the object. For example, for the toy castle 205, the object recognition engine identifies local features 220, 222, and 224. Each local feature is a feature that can, alone or in combination with one or more other local features, uniquely identify the object 220. It is possible that a single image could result in hundreds or even thousands of descriptors. They can include logos, an edge of the shape of the object 220, a pattern, etc. The object recognition engine then derives a descriptor for each of the identified local feature, based on colors, shape, contour, and other attributes as described above. In this example, the object recognition engine derives a descriptor 226 for local feature 220, a descriptor 228 for local feature 222, and a descriptor 230 for local feature 224.

Similarly, the object recognition engine identifies local features 232, 234, and 236 for toy cat 210. The object recognition engine then derives a descriptor 238 for the identified local feature 232, derives a descriptor 240 for the identified local feature 234, and derives a descriptor 242 for the identified local feature 236.

The object recognition engine also identifies local features 244, 246, and 248 for soda can 215. The object recognition engine then derives a descriptor 250 for the identified local feature 244, derives a descriptor 252 for the identified local feature 246, and derives a descriptor 254 for the identified local feature 248.

Although only three local features have been identified for each object in this example, it is contemplated that tens or even hundreds of local features can be identified by the object recognition engine for each object, and therefore tens or even hundreds of descriptors can be derived by the object recognition engine for each object. Most typically, an identified object can be associated with one or more descriptor sets. Descriptor set can comprise a homogeneous or mix of descriptors. For example descriptors associated with image descriptors, DAISY, hue-SIFT, SIFT, SIFT 2.0, FREAK, SURF, BRISK, FAST, video recognition, etc.

FIG. 2 also illustrates a set of example activation policies 256, 258, 260, and 262 that are stored in the policy database 135. The activation policies that are stored in the policy database 130 can be generated by different sources. Some of the policies can be generated by a third party such as content provider. In these cases, the content provider can also provide policies associated with the content (e.g., under what condition can the content be made available to a user). Alternatively, some of the policies can be generated by the content activation system 100 or an administrator of the content activation system 100.

Regardless of who generated the policies, each activation policy is associated with a content set. That is, each activation policy set forth a set of rules that govern how and when the content set should be activated or otherwise made available to users. For example, activation policy 256 is associated with some augmented reality animation as it governs when the content activation system 100 should overlay the toy characters on top of the image of the toy castle 205. Similarly, activation policy 258 is associated with coupon content as the policy 258 governs when the content activation system 100 should display the coupon for a free toy to the users. Activation policy 260 is associated with a different coupon content as the policy 260 governs when the content activation system 100 should display the coupon for a free soda to the users. Activation policy 262 is associated with nutritional information content as the policy 262 governs when the content activation system 100 should display the nutritional information about the soda to the users.

In addition to being associated with content, each activation policy is also associated with a group of descriptors. That is, the set of rules in each activation policy uses a group of descriptors as part of the condition to be satisfied before activating the content. In some embodiments, some activation policies can define the condition to include a mandatory group of descriptors to be present, at least to within a similarity measure possibly based on a nearest neighbor search. Thus, when the recognition engine 110 derives a descriptor set (e.g., descriptor set 185), the descriptor set has to include all descriptors in the fixed group of descriptors in order for the content activation system 100 to activate the content associated with the policy.

The purpose of requiring a group of descriptors to be present in the descriptor set is to make a determination that the object associated with the group of descriptors is represented in the image. However, given the fact that a single image of an object can only represent the object in a limited perspective view, and that some of the features of the object might not be shown clearly (e.g., being cut off from the image, blurry, etc.), it is contemplated that a fuzzier approach should be taken in recognizing objects in an image. Therefore, some activation policies can define the condition to include a factional requirement (e.g., ratio, percentage, etc.) on a group of descriptors. That is, when the recognition engine 110 derives a descriptor set (e.g., descriptor set 185), the descriptor set only needs to include at least the predetermined percentage of descriptors in the group of descriptors in order for the content activation system 100 to activate the content associated with the policy. In addition, a policy can include more than one groups of descriptors in the condition and provides different percentage requirements for the different groups of descriptors.

As shown in FIG. 2, activation policy 256 has a descriptor condition that requires 70% of descriptors associated with toy castle 205. Activation policy 258 has a descriptor condition that requires 40% of descriptors associated with toy castle 205 and 80% of descriptors associated with toy cat 210. Activation policy 260 has a descriptor condition that requires 70% of descriptors associated with toy cat 210 and 70% of descriptors associated with soda can 215. Finally, activation policy 262 has a descriptor condition that requires 60% of descriptors associated with soda can 215. In other embodiments, the content management module 120 can implement other algorithms (e.g., one to one correlations, multivariate analysis, correlation mapping, best-bin-first search methods, Hough transforms, or other algorithms) to match the descriptor set to policies. It should be appreciated that descriptors do not have to be exact matches with respect to the descriptors stored in the activation policy. Rather, the conditions for activation could require that a sufficient number of descriptors be close to the activation policy descriptors within the descriptor space. Thus, the activation criteria might require a defined number of nearest neighbor matches that are similar rather than exact matches. Similarity measure among descriptors depends on the nature of the descriptors. For example, embodiments that leverage 128-dimensioned SIFT descriptors might use a Hamming distance or Euclidean distance as a similarity measure.

The content management module 120, upon receiving the descriptor set 185, determines if the descriptor set 185 satisfies any one or more of the descriptor conditions set forth by the activation policies stored in the policy database 135. When the content management module 120 determines that the descriptor condition of a policy is met by the descriptor set 185, the content management module 120 retrieves, from the content database 130, content associated with the policy.

In addition to descriptor condition, each of the policies 256, 258, 260, and 262 can also include other types of condition as mentioned above, such as temperature condition, location condition, payment condition, time condition, user security condition, etc. In these embodiments, the content activation system 100 is configured or programmed to retrieve relevant information from either the device from which the digital representation is received (e.g., the camera, the smart phone, etc.) or from the digital representation itself. For example, payment condition can be satisfied by a user capturing his/her credit card in the image and authorizes the content activation system to charge a fee with the credit card. In some of these embodiments, the content activation system is programmed to detect a presence of a credit card in the digital representation (e.g., digital representation 150) by analyzing the descriptor set 185. The content activation system is also programmed to provide an interface for the user to authorize payment using the credit card. Instead of requirement a certain object to be present in the digital representation, some activation policies can include a condition that requires a certain object to be excluded from the digital representation (e.g., minor to be not present, competitor product to be not present, etc.).

One of the advantages of this system is that content provider can control the condition of allowing different users accessing its content. In some embodiments, the activation policy essentially implements specific licenses to the content. Additionally, the content provider can change the activation policies associated with the content from time to time to reflect changes to the licenses.

Figure 3:
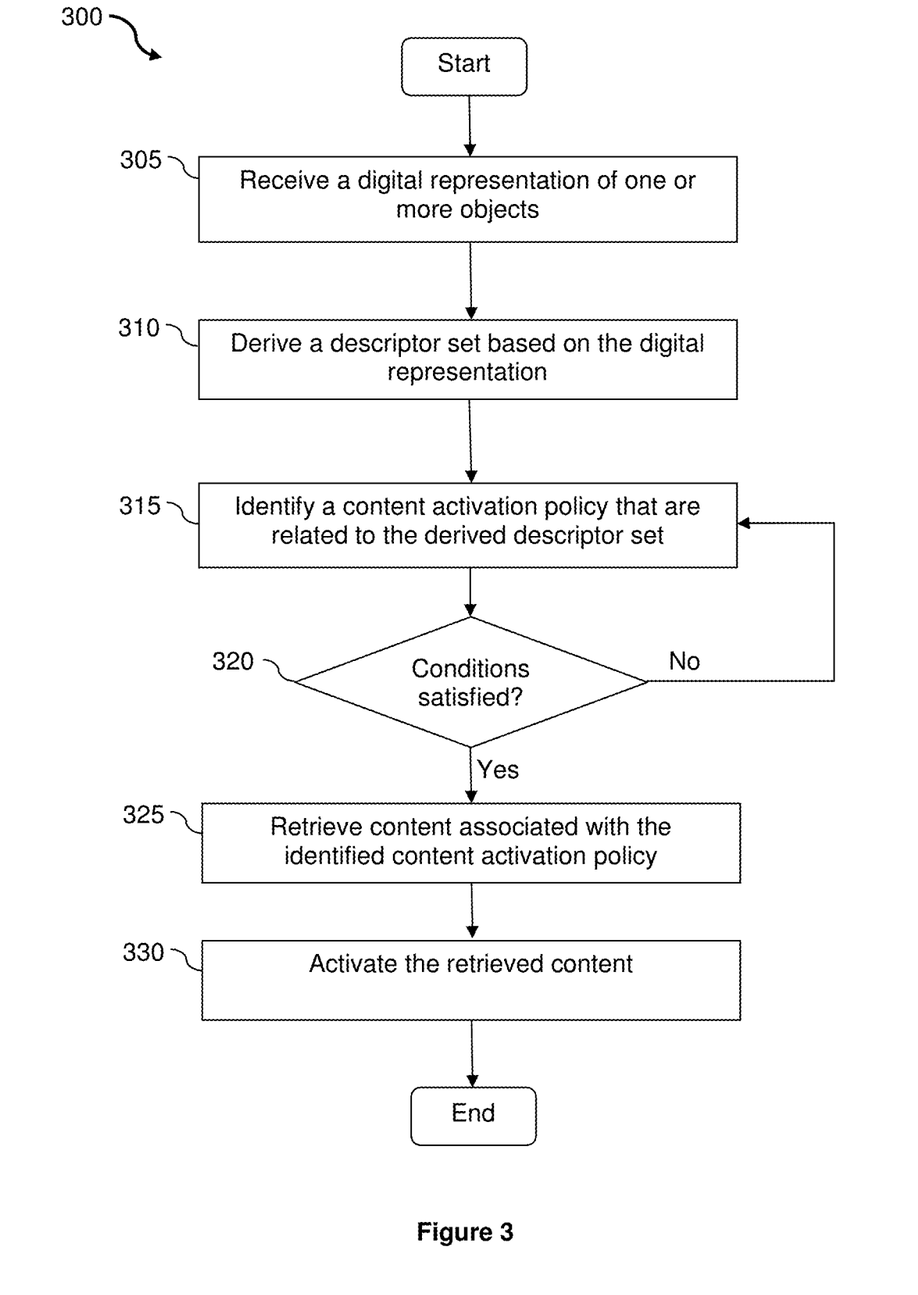
FIG. 3 illustrates a process for activating content.

FIG. 3 illustrates a process 300 for activating content using the content activation system 100. The process 300 begins by receiving (at step 305) a digital representation of one or more objects. The digital representation can be an image file, an audio file, a video file, etc. The process 300 then derives (at step 310) a set of descriptors based on the digital representation. After that, the process 300 identifies (at step 315) a content activation policy that are related to the descriptor set. As mentioned above, the one or more content activation policies govern the conditions under which the content activation system 100 can activate or otherwise make available a set of content to the user. The conditions can include conditions other than descriptors, such as time condition, location condition, user security clearance condition, etc. Thus, the process 300 at step 320 determines if all conditions set forth in the identified policy are satisfied. If not all of the conditions are satisfied, the process 300 returns to step 315 to identify another content activation policy in the policy database 135 that is related to the descriptor set. On the other hand, if all conditions set forth in the policy are satisfied, the process 300 proceeds to step 325 to retrieve content that is associated with the identified policy. Finally, the process 300 activates the retrieved content for the user.

Several applications of the content activation system 100 are further described below. Consider a scenario where content associated with a toy can be accessed via a dedicated augmented reality application running on a smart phone or tablet where the application employs object recognition techniques to identify the toy. Before the toy is released in the market, one can use the object recognition techniques (see co-owned U.S. Pat. Nos. 7,016,532, 8,224,077, 8,224,078, and 8,218,873) to identify descriptors associated with the toy. In the field, when the augmented reality application captures an image of the toy and generates similar descriptors, the application can look-up the content and the activation policies in the database.

Consider the augmented reality application discussed above that activates augmented reality content upon recognition of a toy. In one embodiment, the application can function on a mobile device and operates as a content activation system. If the user captures an image of the toy via the application, the application can seek out an activation policy associated with the toy. The policy might activate content in response to the mere presence of the toy. Further, the policy could include support for "in-app" purchase of additional content, perhaps in response to user confirmation in conjunction with recognition of a part of the toy. Thus, from the application interface a user can take a photograph of an object, record video of the object, detect another signal transmitted by the object, to initiate a transaction. Upon recognition of the object or a part of the object, the application presents the user with an opportunity to purchase licensed content.

Although the above examples describe an application capable of activating content in accordance with an activation policy in response to recognizing an object, the application can also provide access to the content via other routes. One could download the application into a mobile device and then purchase the content in lieu of imaging the toy. If the toy is present, no purchase might be necessary as dictated by the activation policy.

In another embodiment, the content activation system can function as a base application that provides consumers the ability to purchase an object-specific application. In this example, the act of recognition initiates a transaction wherein the user is offered the object-specific app, and the corresponding purchase unlocks access to the protected features. Access to the features can vary in scope or duration. The application or the content can be available in basic versions, versions that have increasing tiers of features, or top of the line versions. The technology can be available as a discreet purchase or as a subscription service. The term of access to the technology and content can vary from minutes, hours, weeks, months, years, and any appropriate measure of time for the particular technology.

In yet further embodiments of the content activation system, upon identification of an object while the application is active, additional functionality within the app can be enabled. For example, content activation can occur while tracking the object or tracking features of the object. Such activation permits the content to adapt and update in real-time using the object as the anchor for delivery of the content. Perhaps as the object moves relative to the user's capturing device, content can be unlocked in accordance with the policy. In situations where the object is not readily accessible, it can be desirable to enable a user to purchase content without the object.

In contemplated embodiments of the inventive subject matter, the content activation system can enhance a user's experience/interaction with real-world objects. For example, the possible ways a child can play with a castle can be extremely limited. In the most limited circumstances, the child has only his or her imagination to conceive of play scenarios. In some cases, the child can have figurines, dolls, books, stories, movies, or other accessories to play with in conjunction with the castle. However, it is often inconvenient for the parent/gift giver to find and purchase the associated products and media for the child. One object of the inventive subject matter is to broaden the range of experience-enhancing media and content available and to facilitate access to that media and content.

In addition to toys, some embodiments of the content activation system can work with real-world objects including: products, vehicles, or machines. Products compatible with the content activation system can be books, DVDs, CDs, and other corporeal media. Other products can include grocery items, for example: food boxes, cans, bottles, and other packages, meats (e.g., in a deli case), and vegetables (e.g., in a package, in a display, or pictured in an advertisement). In cases where the content is identified in a grocery store, the content activated can be recipes, coupons, nutrition information, or other health/wellness-related information. Yet other products can include: clothing, shoes, accessories, cosmetics, or appliances.

In some cases, the products identified by the content activation system can be: tennis balls/racquets, badminton, a basket ball, a base ball or baseball bat, ice skates or roller blades, swimming goggles, or other sports equipment. Along these lines, the real-world objects can be swim suits, jerseys, uniforms or other sports apparel. In one example embodiment sports memorabilia such as, baseball cards, trading cards, autographed baseballs, autographed basketballs, autographed photographs, or other autographs.

In addition to the above examples of inanimate objects, living creatures can also serve as real-world objects recognized by the content activation system. In one embodiment, a visitor at an aquatic park can captures video of a performance. The recognition engine can identify descriptor sets associated with the identified set/stage where the show is presented where the system obtains a related activation policy. The content activation system can also identify descriptor sets associated with upon identification of the animal performer, other performers in the cast, other audience members, blimps in the sky, or the audio narration that accompanies the show. Additionally, based on the time of day, the lighting conditions, the temperature or other environmental conditions, different descriptor sets can be obtained that correspond to objects identified within the captured video. For example, the recognition engine can obtain a descriptor set associated with the human trainer that commands dolphins at the 3:00 p.m. show. All these factors can influence the activation policy of the content.

Other real-world objects that can be identified and used by the recognition engine to obtain descriptor sets and related activation policies include: printed matter, videos, video clips, sounds, music, light, RFID, magnets, pictures, buildings, electronic devices, and other objects in the proximity of the user. In one embodiment, the content activation system can be configured to identify the teddy bear from the previous example in a movie poster. The recognition engine then can obtain a descriptor set associated with the teddy bear or the movie, which in turn provides access to a corresponding activation policy. If a person has purchased a movie ticket and captures an image of the movie poster, the activation policy could be configured to release access to a small game or a premium trailer. It should be appreciated that inputs such as representations of part of the object, alphanumeric text, or other characteristic symbols can stimulate the recognition engine to obtain descriptor sets. For example, it can be desirable for the content activation system to identify the teddy bear's face, a bow on the teddy bear, the teddy bear's paw, a magnet located within the teddy bear, or light or sound emitted from the teddy bear.

In further aspects of the inventive subject matter the content activation policy can be a license. For example, a license to access a video in which the teddy bear is the lead character. The license could also be for an educational application, where the teddy bear is a prop in educational exercises that help the child learn the alphabet, numbers, how to read, add, subtract, do math, or learn other lessons. The license can vary in scope, such that at each tier, the licensee grants access to a different level of content. The tiers available can depend on fees paid, subscription status, participation in a loyalty program, or other metrics. The levels of content can be low, medium, and high for example, wherein the low level comprises standard content, and each level higher adds additional content or supplementary features. For example a basic service can provide content comprising multiple choice problem sets upon recognition of the teddy bear or other object. A mid-level service can comprise a computer adaptive model, where the content adjusts the difficulty of problems presented to the user according to the user's abilities as measured by the user's performance on prior questions. A high-level service can offer content that adds to the other content by addition of free-form answer questions. Such content can include or separately provide for real-time feedback from a human tutor, a machine-based tutor, or other instructor. In yet further aspects, the content could be for augmented reality content, such that the child and the toy can become characters in an augmented reality scripted or unscripted game.

It should be appreciated that content activation or rendering rules can operate based on a licensing fee associated with the license. For example, at a lower licensing rate, the content activated can be basic in comparison to more sophisticated content offered at a higher licensing rate. For example, e-books could be available at a low rate and augmented reality games could be available at a higher licensing rate. Thus, the content could be activated to initiate a transaction, exchange currency, exchange virtual currency, alter speed or power of an object, or otherwise create a possible engagement point for the consumer.

It can be desirable for a security policy to serve as the content activation policy. In such embodiments, the security policy can limit access to the content based on the user's authorization status. Similarly, when content is best restricted by age limitations, a security policy can act as a barrier between underage users and the restricted content by requiring a parental control authorization.

In a medical context, the content activation policy can be HIPAA compliant to protect patient confidentiality. Security systems wherein authorized users have to input passwords, credentials, identification information, or other security inputs are one way the content activation system can operate to safeguard patient data. The security activation policy can be adapted to the needs and security clearance of users who are patients, hospital employees, insurance company employees, government regulators, commercial entities, data aggregators, or other interested parties. A more specific example could include using the disclosed techniques to provide access to electronic medical records for various stakeholders associated with a patient. For example, a patient visiting a doctor, or other healthcare provide, might wish to release portions of their electronic medical records (EMRs). The patient could image an object in the doctor's office using their smart phone's camera. The image of the object can then be bound to one or more EMRs along with the patients preferred policies on how such EMRs can be accessed. Once the corresponding access policy has been established by the patient, or by other data owner, the doctor could then activate the policy by capturing an image of the same object. In such an embodiment, the doctor's device and the patient's device would likely participate within the same content access ecosystem. The ecosystem could be a proprietary system, an EMR system, or even a cloud-based data management system.

In yet further embodiments of the inventive subject matter, the content activation policy can include content activation criteria. Upon satisfaction of the content activation criteria, the content can then be unlocked and accessed by the user. It is envisioned that exemplary content activation systems will employ content activation or rendering rules that operate based on at least one of tracked features and recognized features in the digital representation derived from the descriptor set. For example, the content activation rules can operate based on a princess doll. In such circumstances, the user can be taking video of the child playing with the princess doll and the toy castle from the example above. The rending rules can track the audio and movements of the princess doll and use those inputs to compose an augmented reality animation. For example, if the child shows the princess gliding through the air while making reptilian sounds, the content activation rules can generate a cartoon dragon and clouds, so the princess appears to ride a flying dragon in the display of a user interface. At the same time or in the alternative, the content activation system could recognize an article of the princess's clothing, such as a cape, and use the corresponding descriptor set to access the dragon animation content set.

In further aspects of the inventive subject matter, activation criteria comprises content activation rules that act as a key to unlock the content set as a function of the descriptor set. In such content activation systems, the content set comprises purchased content. For example, if the digital representation of the castle is a still image, then the descriptor set can unlock a content set comprising a set of graphics tools the child can use to modify the image of the castle. In contrast, if the digital representation of the castle is video, and the descriptor set is multi-modal, the descriptor set can unlock a video-editing or animation suite. It is contemplated that the activation criteria can include content activation rules that operate based an in-app purchase of content, for example selection of one or more content sets.

Most typically, activation criteria likely comprise a selection of content. In such embodiments, the content management module will output a menu to the user. The user can then select activated content, unlock content by entering security data, or unlock content by making a purchase, watching an advertisement, or completing other requirements. Consider a scenario where the activation policy is associated with a set of collectible toys. In such case, any single toy in the set might provide sufficient information (e.g., descriptors, features, context, etc.) to cause a corresponding activation policy to take effect. The activation policy could restrict access to toy-related content based on the number of observed toys. If single toy is observed, the activation policy might allow the user to access or engage with a single item of content; possibly using the position or orientation of the toy as a content selection pointer via an augmented reality interface. If two or more toys are observed, additional content could be unlocked by the activation policy. If all the toys in the set are observed, all the content could be unlocked.

It should also be appreciated that the content set can take many forms. Content sets can be selected from at least one of the following: image data, light data, RFID data, magnetic data, video data, game data, augmented reality data, audio data, kinesthetic data, tactile data, vibration data, texture data, application data, device command data, account data, shopping data, travel data, education data, sports data, news data, weather data, medical data, electronic medical record data, or other types of data.

The content management module can then output the activated content set(s) to devices such as: printers, 3D printers, tablets, smart phones, kiosks, appliances, medical equipment, televisions, vehicles, computers, phones, wearable headsets, wearable AR headsets, wearable camera, wearable devices, vending machines, or cameras.

In yet further embodiments of the content activation system, a rights management module can be coupled with the content management engine. In such systems, the rights management module can be configured to enforce digital rights with respect to the content set according to a content rights rules set that operates as a function of the descriptor set. For example, recognition and the arrangement of descriptors can influence which rights should be enforced. In some cases, the content rights rules set includes rules for at least one of the following as a function of the descriptor set: activation of the content set, deactivation of the content set, modification of the content sent, creation of the content set, localization of the content set, transactions related to the content set, and account interactions. One example of a transaction related to the content set would be to freeze the content and offer a license for the user to purchase, which upon purchase permits the content to resume delivery/presentation.

The disclosed techniques also give rise to social or shared experiences. Content activation policies could be constructed in a manner that requires multiple individuals to observe the same object at the same time in order for the content policy to activate content. For example, a brand owner might offer promotional content associated with their products. The brand owner could require a consumer to capture and recognize a product within a time window along with at least three friends in the consumer's social network to unlock the promotional content. Such an approach allows consumers to share a shopping experience. The same technique could be applied to other platforms. Within a context of a social networking site (e.g., Facebook®, Instagram®, Pinterest®, etc.), the site or other stakeholder could construct an activation policy that depends on having multiple individuals to capture similar content in order of the policy to take effect. In this setting, the site or even a user could guide creation of additional content.

It should be appreciated that the disclosed techniques can leverage content activation policies as a mechanism for automatic curation of content based on a recognition event. The creator of the content activation policy can outline rules by which content is presented to the user based on the nature of the recognition event of an object. The rules in the policy could dictate when to present content, the ranking of content elements, an order of presentation of content, a stacking of content (e.g., foreground/background placement of augmented reality images, overlays, etc.), a temporal ordering of content, a search for additional content, or other factors. When a device recognizes an object, the resulting descriptor set and other information can be used to influence the curation of the content. For example, an orientation or position could indicate search parameters for additional content, or could indicate ranking. Perhaps when descriptors of a magazine cover indicate that the magazine is upside down relative to the field of view, content associated with objects closest to the camera should be ranked higher in presentation or should be searched first.

Through the use of a recognition-based activation policy, one can construct multi-dimensional content curation. For example, capturing an image of a 2D image (e.g., magazine cover, television screen, billboard, etc.), could cause activation of a policy that generates numerous types of 3D content (e.g., video, etc.). Even further, recognition of a 3D object (e.g., human, toy, etc.), could give rise to curation of 4D content (e.g., articulated or move 3D model, etc.). Thus, activation policies can represent a curation of content based on one or more dimensions of relevance.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A content activation system comprising:
   a database of activation policies indexed by descriptors generated from image data of different objects, the descriptors containing information about relationships between pixels in the image data;
   at least one processor; and
   at least one non-transitory computer readable memory for storing software instructions executable by the at least one processor to perform operations comprising:
   obtaining a descriptor set associated with an object by executing an image recognition algorithm to recognize the object in a digital image containing the object, the descriptor set including at least one descriptor containing information about a relationship between pixels in the digital image;
   identifying at least one content activation policy as a function of the descriptor set by traversing the activation policies stored in the database, the content activation policy comprising content activation criteria including one or more selected from the group consisting of: payment requirements, location requirements, time requirements, and user identity;
   identifying a content set associated with the object and based on the descriptor set; and
   activating the content set in an output device according to content rendering rules of the activation policy.

2. The system of claim 1, wherein the descriptor set comprises image descriptors.

3. The system of claim 1, wherein the descriptor set comprises multi-modal descriptors.

4. The system of claim 1, wherein the descriptor set comprises a homogenous mix of descriptors.

5. The system of claim 1, wherein the at least one content activation policy comprises a license.

6. The system of claim 5, wherein the content rendering rules operate based on a license fee associated with the license.

7. The system of claim 1, wherein the content rendering rules operate based on recognized features in the digital image that are derived from the descriptor set.

8. The system of claim 1, wherein the content rendering rules unlock at least some of the content set as a function of the descriptor set.

9. The system of claim 1, wherein the content rendering rules operate based on an in-app purchase of content.

10. The system of claim 7, wherein the content set comprises purchased content.

11. The system of claim 1, wherein the at least one content activation policy operates as a function of at least one of tracked features and recognized features within the image.

12. The system of claim 1, wherein the activation criteria comprise a selection of content.

13. The system of claim 1, wherein the output device comprises at least one of the following: a printer, a 3D printer, a tablet, a smart phone, a kiosk, an appliance, a television, a vehicle, a computer, a phone, a wearable headset, a wearable AR headset, a wearable camera, a wearable device, and a camera.

14. The system of claim 1, wherein the recognized object comprises a real-world object.

15. The system of claim 14, wherein the real-world object comprises at least one of the following: a product, a toy, a vehicle, a machine, a living creature, an inanimate object, printed matter, a video, a video clip, a sound, a music, a light, a RFID, a magnet, a picture, a building, a human, an appliance, and an electronic device.

16. The system of claim 1, wherein the recognized object comprises a virtual object.

17. The system of claim 16, wherein the virtual object comprises at least one of the following: a rendered graphic, a game object, a digital image, a digital video, an animation, an augmented reality object, a sound, and a 3D modeled object.

18. The system of claim 1, wherein the operations further comprising enforcing digital rights with respect to the content set according to a content rights rules set that operates as a function of the descriptor set.

19. The system of claim 18, wherein the content rights rules set includes rules for at least one of the following as a function of the descriptor set: activation of the content set, deactivation of the content set, modification of the content sent, creation of the content set, localization of the content set, transactions related to the content set, and account interactions.

20. The system of claim 1, wherein the content set comprises at least one of the following: image data, light data, RFID data, magnetic data, video data, game data, augmented reality data, audio data, kinesthetic data, tactile data, vibration data, texture data, application data, device command data, account data, shopping data, travel data, education data, sports data, news data, weather data, and medical data.

21. The system of claim 1, wherein the activation criteria define content release requirements.

22. The system of claim 1, wherein the activation criteria define content release conditions.

23. The system of claim 1, wherein the activation criteria comprise at least one of the following: descriptor requirements, payment requirements and location requirements.

24. The system of claim 1, wherein the activation criteria include security clearance requirements.

25. The system of claim 24, wherein the security clearance requirements comprise one or more of the following: passwords, credentials and identification information.

26. The system of claim 1 wherein the output device comprises at least one of the following: a 3D printer, a tablet, a smart phone, a gaming console, a kiosk, an appliance, a television, a vehicle, a computer, a phone, a wearable headset, a wearable AR headset, a wearable camera, a wearable device, and a camera.

27. The system of claim 1, wherein the image recognition algorithm comprises an algorithm selected from the group consisting of SIFT (scale-invariant feature transform), FREAK (fast retina keypoint), DAISY, and FAST (features from accelerated segment test).

28. The system of claim 1, wherein the object comprises a three-dimensional object.

29. The system of claim 28, wherein the three-dimensional object comprises a card.

30. The system of claim 1, wherein the content activation policy includes a group of descriptors and a descriptor condition for identifying the content activation policy as a function of the descriptor set associated with the object, the descriptor condition requiring a specified portion of the group of descriptors to match the descriptor set according to a similarity measure.

31. The system of claim 1, wherein said identifying the at least one content activation policy includes traversing the activation policies stored in the database in real time with said obtaining the descriptor set.

32. The system of claim 1, wherein the activation policies are indexed in the database by the descriptors using a tree data structure or a k-nearest neighbors scheme.

33. A content activation system comprising:
a database of activation policies indexed by descriptors generated from image data of different objects, the descriptors containing information about relationships between pixels in the image data;
a recognition engine that obtains a descriptor set associated with an object by executing an image recognition algorithm to recognize the object in a digital image containing the object, the descriptor set including at least one descriptor containing information about a relationship between pixels in the digital image; and
a content management module that:
obtains the descriptor set from the recognition engine;
identifies at least one content activation policy as a function of the descriptor set by traversing the activation policies stored in the database, the content activation policy comprising content activation criteria including one or more selected from the group consisting of: payment requirements, location requirements, time requirements, and user identity;
identifies a content set associated with the object and based on the descriptor set; and
activates the content set in an output device according to content rendering rules of the activation policy.

34. The system of claim 33, wherein the content rendering rules operate based on recognized features in the digital image that are derived from the descriptor set.

35. The system of claim 33, wherein the content rendering rules unlock at least some of the content set as a function of the descriptor set.

36. The system of claim 33, wherein the content rendering rules operate based on an in-app purchase of content.

37. The system of claim 34, wherein the content set comprises purchased content.

38. A non-transitory computer readable memory storing software instructions executable by a processor to perform operations comprising:
obtaining a descriptor set associated with an object by executing an image recognition algorithm to recognize the object in a digital image containing the object, the descriptor set including at least one descriptor containing information about a relationship between pixels in the digital image;

identifying at least one content activation policy as a function of the descriptor set by traversing activation policies stored in a database of activation policies indexed by descriptors generated from image data of different objects, the descriptors containing information about relationships between pixels in the image data, the content activation policy comprising content activation criteria including one or more selected from the group consisting of: payment requirements, location requirements, time requirements, and user identity;

identifying a content set associated with the object and based on the descriptor set; and activating the content set in an output device according to content rendering rules of the activation policy.

* * * * *